(12) United States Patent
Lee et al.

(10) Patent No.: US 7,979,618 B2
(45) Date of Patent: Jul. 12, 2011

(54) IMAGE FORMING APPARATUS AND CONTROL METHOD THEREOF

(75) Inventors: Jong-seung Lee, Seoul (KR); Yoon-tae Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 11/962,379

(22) Filed: Dec. 21, 2007

(65) Prior Publication Data

US 2009/0019203 A1  Jan. 15, 2009

(30) Foreign Application Priority Data

Jul. 12, 2007 (KR) .................. 10-2007-0070241

(51) Int. Cl.
*G06F 13/24* (2006.01)
*G06K 1/10* (2006.01)
*G06K 15/10* (2006.01)
*G06F 15/80* (2006.01)
*G06F 13/14* (2006.01)
*H04N 1/10* (2006.01)

(52) U.S. Cl. .......... 710/260; 358/1.5; 358/1.9; 345/505; 345/520

(58) Field of Classification Search .................. 710/260; 358/1.5, 1.9; 345/505, 520
See application file for complete search history.

(56) References Cited

U.S. PATENT DOCUMENTS

| | | | | |
|---|---|---|---|---|
| 5,706,368 A * | 1/1998 | Mita | ............................. | 382/284 |
| 5,777,755 A * | 7/1998 | Aoki et al. | ..................... | 358/444 |
| 5,861,960 A * | 1/1999 | Suzuki et al. | ................. | 382/239 |
| 6,192,146 B1 * | 2/2001 | Abe | .............................. | 382/165 |
| 6,438,638 B1 * | 8/2002 | Jones et al. | .................... | 710/301 |
| 6,615,305 B1 * | 9/2003 | Olesen et al. | ................. | 710/262 |
| 6,870,637 B1 * | 3/2005 | Watanabe | ....................... | 358/1.9 |
| 7,076,636 B1 * | 7/2006 | Chilton | .......................... | 712/34 |
| 7,162,559 B1 * | 1/2007 | Kallat et al. | .................. | 710/262 |
| 7,200,701 B2 * | 4/2007 | Stultz | ............................ | 710/267 |
| 7,202,974 B2 * | 4/2007 | Kumar et al. | ................. | 358/1.9 |
| 7,254,280 B2 * | 8/2007 | Kagle et al. | ................... | 382/284 |
| 7,266,254 B2 * | 9/2007 | Ishikawa et al. | ............. | 382/305 |
| 7,321,438 B2 * | 1/2008 | Kaizu | ........................ | 358/1.15 |
| 7,444,668 B2 * | 10/2008 | Moyer et al. | ...................... | 726/2 |
| 2002/0105676 A1 * | 8/2002 | Fujiwara et al. | ............. | 358/1.15 |
| 2004/0168005 A1 * | 8/2004 | Civlin | .......................... | 710/260 |
| 2005/0068586 A1 * | 3/2005 | Sano | .............................. | 358/2.1 |
| 2006/0190510 A1 * | 8/2006 | Gabryjelski et al. | .......... | 707/206 |
| 2008/0114924 A1 * | 5/2008 | Frayer et al. | ................. | 711/103 |

OTHER PUBLICATIONS

Jaromir Przybylo, Marek Gorgon, Flexible Resource Arbiter for Heterogenous Image Processing System, Jun. 27, 2001.*

* cited by examiner

*Primary Examiner* — Mark Rinehart
*Assistant Examiner* — Christopher A Daley
(74) *Attorney, Agent, or Firm* — Stanzione & Kim, LLP

(57) ABSTRACT

An image forming apparatus and a control method thereof. The image forming apparatus includes a plurality of image processors which process an image to be formed on a printing medium corresponding to a plurality of colors, a processor which executes an interrupt routine with respect to the plurality of image processors, and a controller which generates an interrupt signal and transmits the interrupt signal to the processor if at least two of the plurality of image processors generate interrupt requests so that the processor executes the interrupt routine.

20 Claims, 8 Drawing Sheets

IMAGE FORMING APPARATUS AND CONTROL METHOD THEREOF

CROSS-REFERENCE TO RELATED APPLICATIONS

This application claims priority under 35 U.S.C. 119 (a) from Korean Patent Application No. 10-2007-0070241, filed on Jul. 12, 2007, in the Korean Intellectual Property Office, the disclosure of which is incorporated in its entirety.

BACKGROUND OF THE INVENTION

1. Field of the Invention

Apparatuses and methods consistent with the present general inventive concept relate to an image forming apparatus and a control method thereof, and more particularly, to an image forming apparatus which receives an interrupt request from a plurality of image processors, and a control method thereof.

2. Description of the Related Art

A conventional image forming apparatus such as a printer, a scanner, a facsimile and a multi-function device transmits and receives data including an interrupt with respect to a memory through a predetermined data bus. An interrupt is generally an asynchronous signal from hardware indicating the need for attention or change.

More specifically, the image forming apparatus generates a predetermined interrupt signal in response to an interrupt request received from an image processor that processes image data and transmits the interrupt signal to a central processing unit (CPU). Then, the CPU executes an interrupt routine that carries out the operation of the interrupt request corresponding to the received interrupt signal.

A color image forming apparatus, which forms a color image on a print medium, includes a plurality of image processors corresponding to a plurality of colors. While the color image forming apparatus receives a plurality of interrupt requests from a plurality of interrupt sources, the color image forming apparatus essentially functions as a mono image forming apparatus in that it carries out each of the plurality of interrupt requests in sequential order, one at a time. Thus, a time delay occurs when processing the respective interrupt requests.

FIG. 1 is a waveform diagram illustrating the processing of interrupt routines of a conventional image forming apparatus.

For example, the conventional image forming apparatus includes four image processors corresponding to cyan C, magenta M, yellow Y, and black K colors. As illustrated in FIG. 1, if interrupt requests corresponding to the C, M, Y, and K colors are sequentially input at points a, b, c, and d, the image forming apparatus generates an interrupt signal nIRQ corresponding to a first interrupt request INT_K of the color K at the point a, and transmits the interrupt signal nIRQ to the CPU.

The CPU then executes the interrupt routine to lower an interrupt level from a logic value of 1 to a logic value of 0 by the interrupt signal nIRQ.

At a point e, when the interrupt level is restored to a logic value of 1 after the interrupt routine corresponding to the first color K is completed, the image forming apparatus generates an interrupt signal nIRQ corresponding to a second interrupt request INT_M of the color M and transmits the interrupt signal nIRQ to the CPU. Then, the CPU executes the second interrupt routine.

After the second interrupt routine is completed, the CPU executes the third and fourth interrupt routines in a similar way.

As described above, the conventional image forming apparatus sequentially processes the plurality of interrupt requests inputted from the plurality of image processors. Thus, a time delay occurs when processing the interrupt requests.

That is, even if the respective image processors generate the interrupt requests almost simultaneously, the conventional image forming apparatus still processes the generated interrupt requests in sequence (i.e. interrupt request #1, associated with the respective color first, interrupt request #2 associated with the respective color second etc.), thereby causing time delay when processing the subsequent interrupt requests.

Also, the conventional image forming apparatus executes the individual interrupt routine with respect to each of the plurality of image processors, which requires the repetitive operation of checking the completion of the interrupt routines one by one.

Also, the data bus is occupied for a long time due to the time delay in processing the interrupt requests, thereby delaying processing requests from other devices and lowering the performance of the whole system.

SUMMARY OF THE INVENTION

Accordingly, the present general inventive concept provides an image forming apparatus which minimizes time delay in processing an interrupt request from a plurality of image processors, and a control method thereof.

The present general inventive concept also provides an image forming apparatus which executes a single interrupt routine with respect to a plurality of image processors without the repetitive operation of checking the completion of each of the interrupt routines associated with each color as it is processed, and a control method thereof.

Further, the present general inventive concept also provides an image forming apparatus which minimizes time delay in processing an interrupt request and manages an overall system efficiently, and a control method thereof.

The present general inventive concept will be set forth in part in the description which follows and, in part, will be obvious from the description, or may be learned by practice of the present general inventive concept.

The foregoing and/or other utilities of the present general inventive concept can be achieved by providing an image forming apparatus, including a plurality of image processors which process an image to be formed on a printing medium corresponding to a plurality of colors, a processor which executes an interrupt routine with respect to the plurality of image processors, and a controller which generates an interrupt signal and transmits the interrupt signal to the processor if at least two of the plurality of image processors generate interrupt requests so that the processor executes the interrupt routine.

The controller may generate the interrupt signal only after receiving a preset number of interrupt requests from the plurality of image processors.

The controller may also generate the interrupt signal only after receiving the interrupt requests from the whole image processors.

The controller may generate the interrupt signal at the last interrupt request point among the interrupt requests from the plurality of image processors.

The controller may include at least one AND gate which receives the interrupt requests from the plurality of image processors and outputs the interrupt signal based on the interrupt requests.

The plurality of image processors may perform halftoning to the image and generate the interrupt requests with respect to the halftoning.

The plurality of colors may include cyan C, magenta M, yellow Y, and black K.

The processor may include at least one register which has an operation mode corresponding to a predetermined setting value, and the plurality of image processors may process the image corresponding to the setting value of the register.

The image forming apparatus may further include a memory which receives a command from the plurality of image processors to process the image.

The image forming apparatus may further include a secondary cache which is provided between the memory and the CPU, and the controller may synchronize the memory and the secondary cache after the processor executes the interrupt routine.

The foregoing and/or other utilities of the present general inventive concept can be also achieved by providing a method of controlling an image forming apparatus which includes a plurality of image processors to process an image to be formed on a printing medium corresponding to a plurality of colors, the method including generating an interrupt signal after at least two of the plurality of image processors generate interrupt requests and executing an interrupt routine with respect to the plurality of image processors.

The generating the interrupt signal may include generating the interrupt signal only if a preset number of interrupt requests are input from the plurality of image processors.

The generating the interrupt signal may also include generating the interrupt signal only after each of the image processors request the interrupt.

The generating the interrupt signal may also include generating the interrupt signal at the last interrupt request point among the interrupt requests from the plurality of image processors.

The image forming apparatus may include a memory which receives a command from the plurality of image processors to process the image by a processor, and a secondary cache which is provided between the memory and the processor, and the method may further include synchronizing the memory and the secondary cache after generating the interrupt signal.

The foregoing and/or other utilities of the present general inventive concept may also be achieved by providing an image forming apparatus having a plurality of image processors to generate a plurality of interrupt requests corresponding to a plurality of colors defining image data, the image forming apparatus including a memory to process the plurality of interrupt request upon receipt of a command from the plurality of image processors and a controller to generate an interrupt signal responsive to the plurality of interrupt requests at a predetermined interrupt request point.

The predetermined interrupt request point is defined as the point wherein the plurality of interrupt requests are transmitted from each of the image processors.

The image forming apparatus may also include a central processing unit to execute a predetermined interrupt routine responsive to the interrupt signal.

The central processing unit may include a register connected to an operator, the register having an operation mode to define a predetermined setting value wherein the plurality of image processors process the image according to the predetermined setting value.

The controller may include a plurality of AND gates and a counter to each receive the plurality of interrupt requests and accordingly generate the interrupt signal.

BRIEF DESCRIPTION OF THE DRAWINGS

The above embodiments and/or utilities of the present general inventive concept will become apparent and more readily appreciated from the following description of the exemplary embodiments, taken in conjunction with the accompanying drawings of which.

DETAILED DESCRIPTION OF THE PREFERRED EMBODIMENTS

Figure 1:
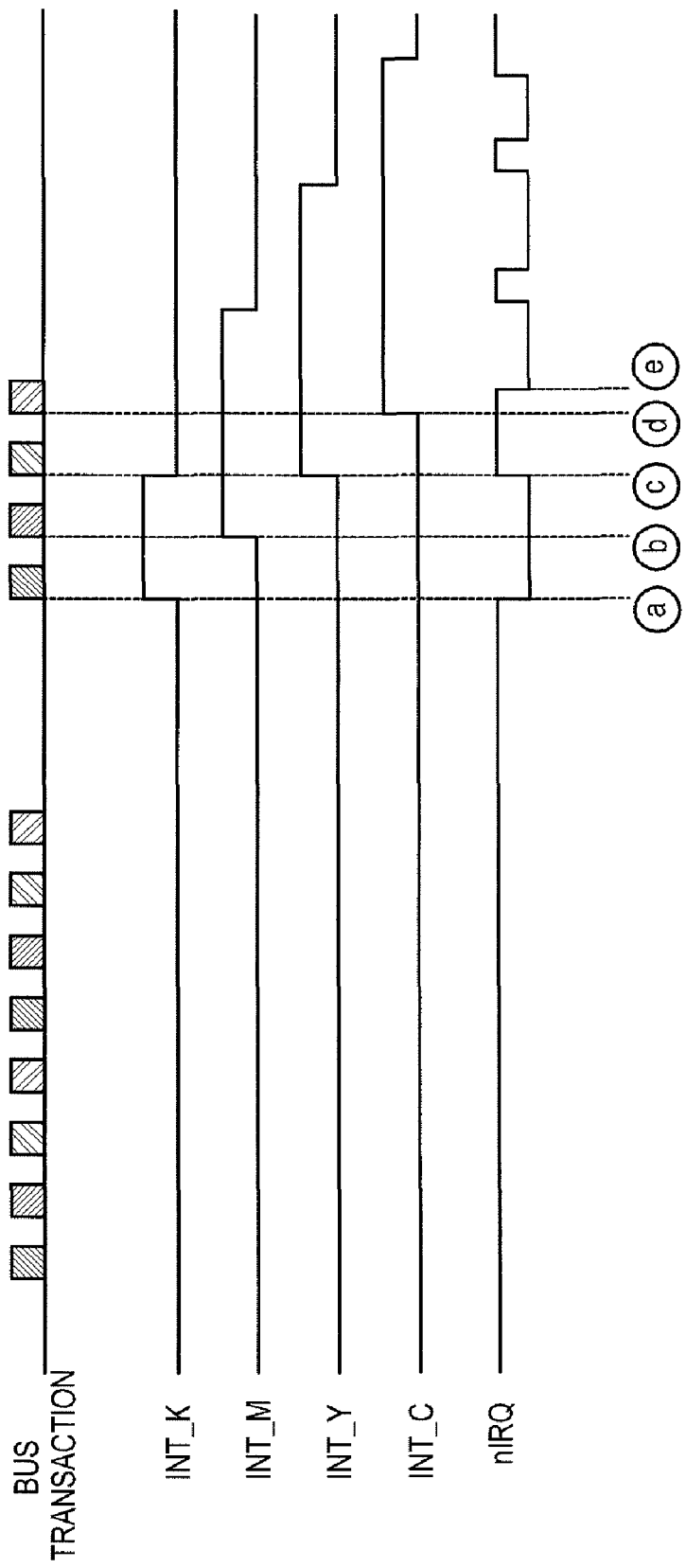
FIG. 1 is a waveform diagram illustrating an interrupt process of a conventional image forming apparatus.

Reference will now be made in detail to the embodiments according to the present general inventive concept, examples of which are illustrated in the accompanying drawings, wherein like reference numerals refer to the like elements throughout. The embodiments are described below in order to explain the present general inventive concept by referring to the figures.

Figure 2:
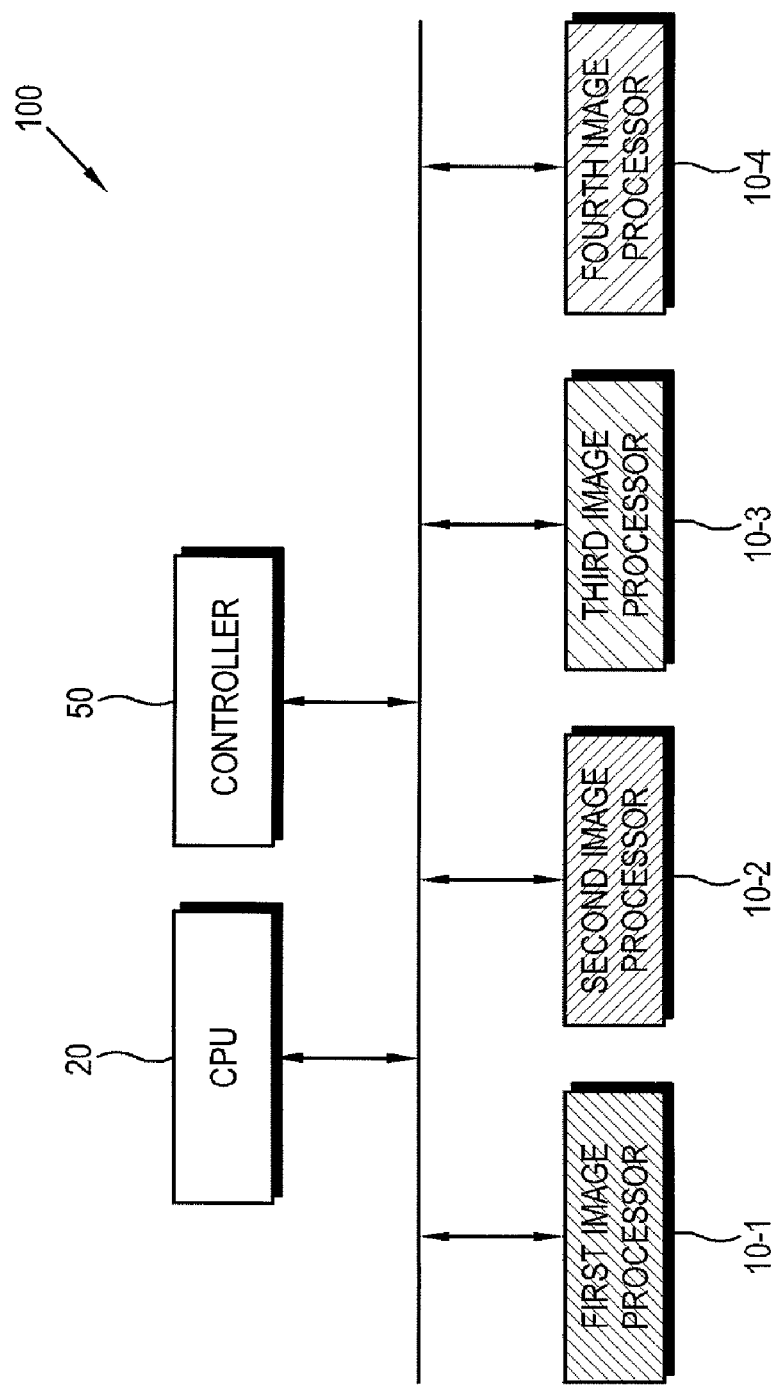
FIGS. 2 and 3 are block diagrams illustrating an image forming apparatus according to exemplary embodiments of the present general inventive concept.
Figure 3:
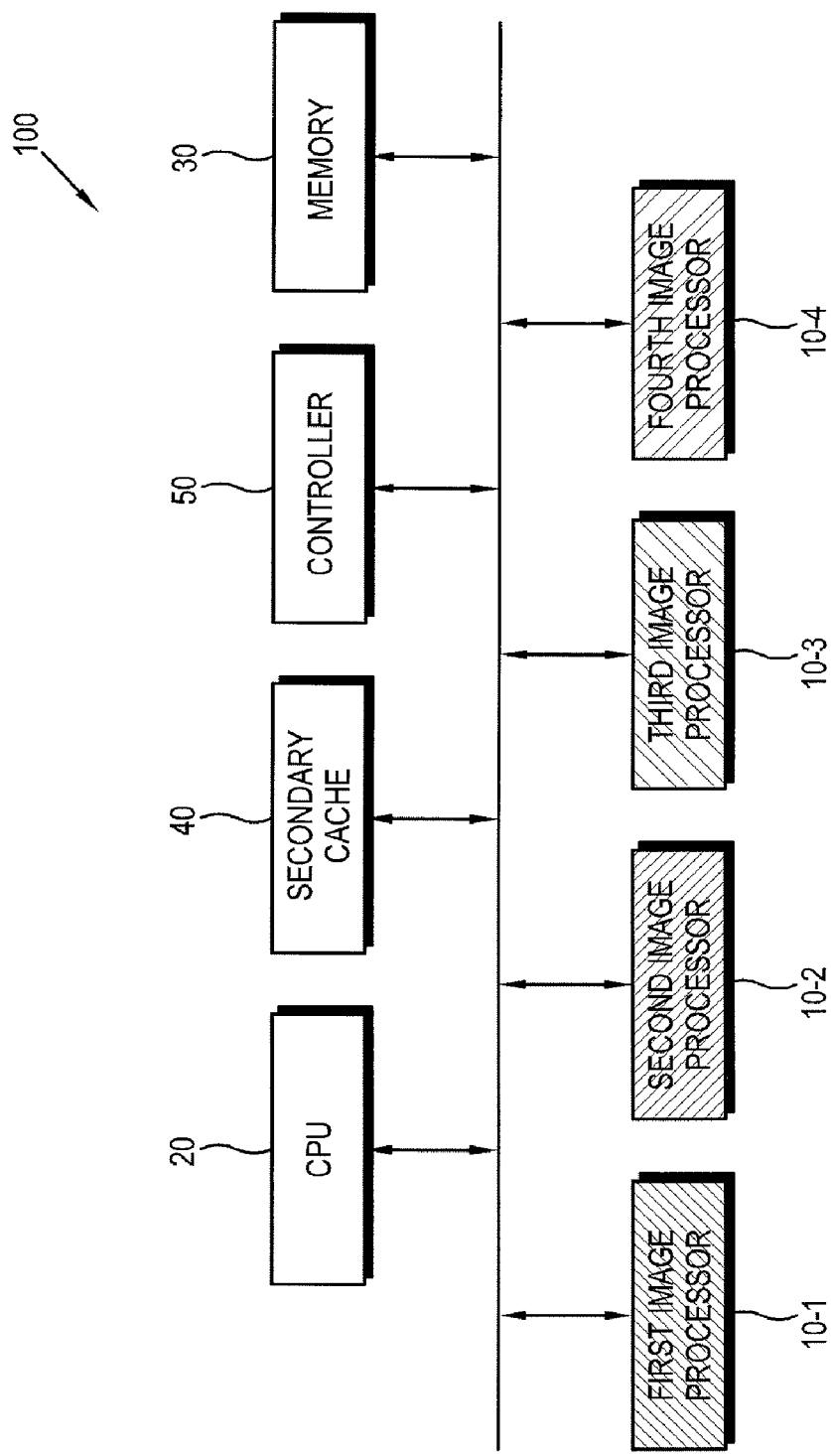

FIGS. 2 and 3 are block diagrams illustrating an image forming apparatus 100 according to exemplary embodiments of the present general inventive concept. The image forming apparatus 100 may include a printer, a scanner, a facsimile, a multi-function device, etc. The present embodiment of the general inventive concept is not limited by the afore-mentioned examples, and accordingly any image forming apparatuses may be utilized.

As illustrated in FIG. 2, the image forming apparatus 100 includes a plurality of image processors 10-1, 10-2, 10-3, and 10-4 which correspond to a plurality of colors, a central processing unit (CPU) 20, and a controller 50. The image forming apparatus 100 may further include a memory 30 and a secondary cache 40, as illustrated in FIG. 3.

The image processors 10-1, 10-2, 10-3, and 10-4 communicate with the memory 30 and share data through a predetermined data bus.

The image processors 10-1, 10-2, 10-3, and 10-4 may also communicate with the memory 30 through a direct memory access (DMA) logic, CPU I/F, etc., which will be described in further detail below.

In particular, image processors 10-1, 10-2, 10-3, and 10-4, according to this exemplary embodiment of the present general inventive concept, include a first image processor 10-1, a second image processor 10-2, a third image processor 10-3, and a fourth image processor 10-4 each corresponding to the cyan C, magenta M, yellow Y, and black K colors respectively. Thus, the image processors 10-1, 10-2, 10-3, and 10-4 may perform image processing corresponding to the plurality of colors to form an image on a printing medium.

The image processors 10-1, 10-2, 10-3, and 10-4 may perform halftoning, rendering, scaling and dithering with respect to the colors C, M, Y, and K corresponding to image data. Halftoning is generally a technique that simulates continuous tone imagery through the use of equally spread dots. Rendering is generally a process of generating an image from a model. Scaling is the process of resizing a digital image. Dithering is generally a technique used to create the illusion of color depth in images with a limited color palette. The image processors 10-1, 10-2, 10-3, and 10-4 may also correspond to red R, green G, and blue B or other colors in place of the colors C, M, Y, and K.

The image processors 10-1, 10-2, 10-3, and 10-4 generate an interrupt request with respect to each of the C, M, Y, and K colors after the CPU 20 completely processes an image corresponding to the image data or after another request is input while the image is being processed. The CPU 20 executes a predetermined interrupt routine according to an interrupt signal sent from the controller 50 with respect to the plurality of image processors 10-1, 10-2, 10-3, and 10-4. The memory 30 receives a command from the plurality of image processors 10-1, 10-2, 10-3, and 10-4 to process the image via the CPU 20.

Figure 8:
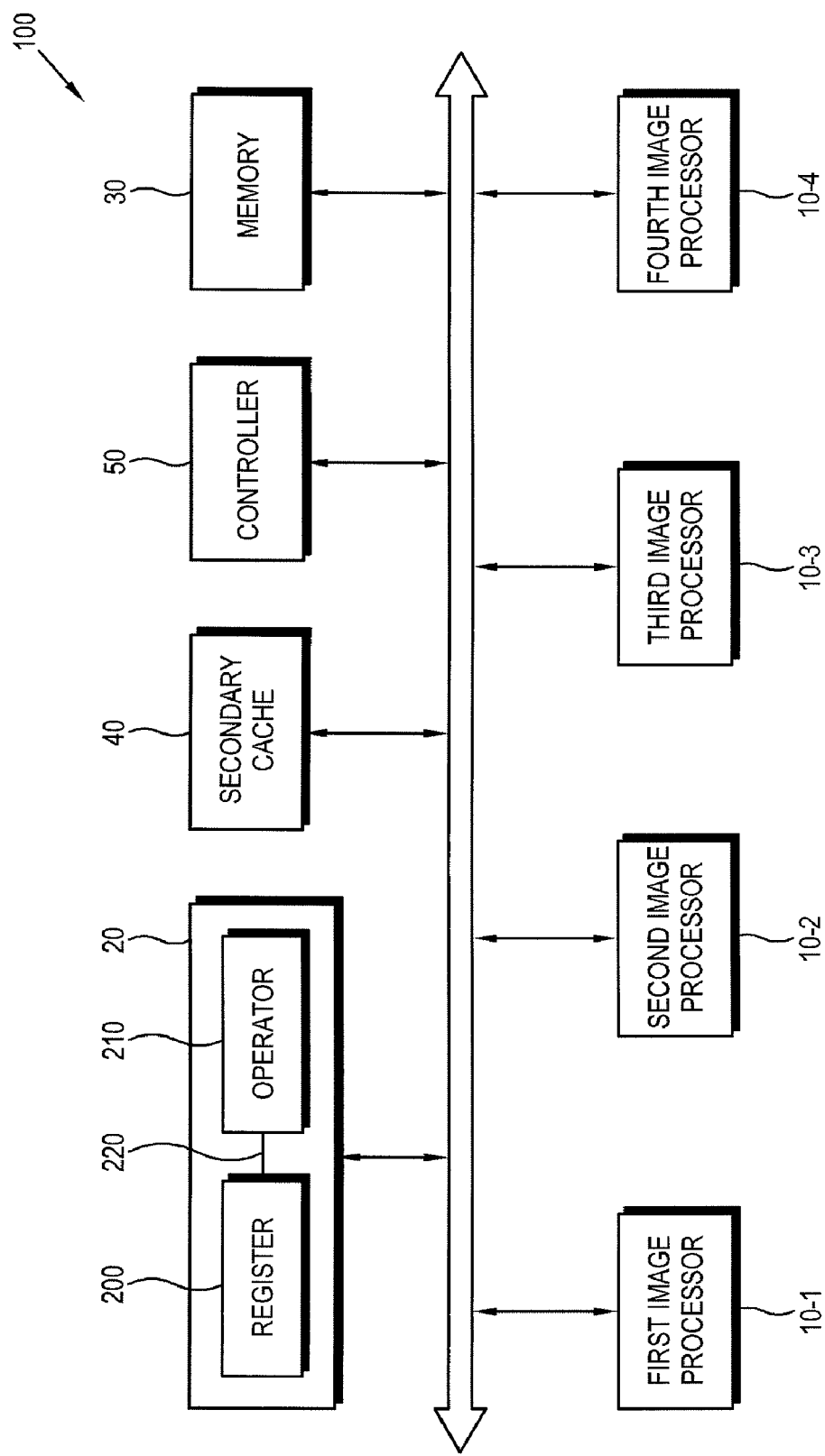
FIG. 8 is a block diagram illustrating an image forming apparatus according to an exemplary embodiment of the present general inventive concept.

The CPU 20 may include at least one register 200 having an operation mode corresponding to a predetermined setting value. More specifically, as illustrated in FIG. 8, the register is connected with an operator (210 in the CPU 20 through an internal bus 220, and has an operation mode corresponding to the predetermined setting value. In other words, the CPU may control the image processors to perform various operations according to a predefined setting value. For example, the CPU 20 may control the image processors 10-1, 10-2, 10-3, and 10-4 to perform halftoning to the image if the setting value of the register is 1, or alternatively control the image processors 10-1, 10-2, 10-3, and 10-4 to scale the image if the setting value is 2. Thus, the plurality of image processors 10-1, 10-2, 10-3, and 10-4 processes the image according to the predefined setting value of the register.

The secondary cache 40 may be provided between the memory 30 and the CPU 20, to reduce the average time it takes for the image processors to access the memory 30, thereby ultimately reducing the overall processing time of the image processors 10-1, 10-2, 10-3, and 10-4. The secondary cache 40 may also alternatively be built in the CPU 20.

The controller 50 generates the interrupt signal and transmits the interrupt signal to the CPU 20 if it is determined that at least two of the image processors 10-1, 10-2, 10-3, and 10-4 generate interrupt requests.

Figure 4:
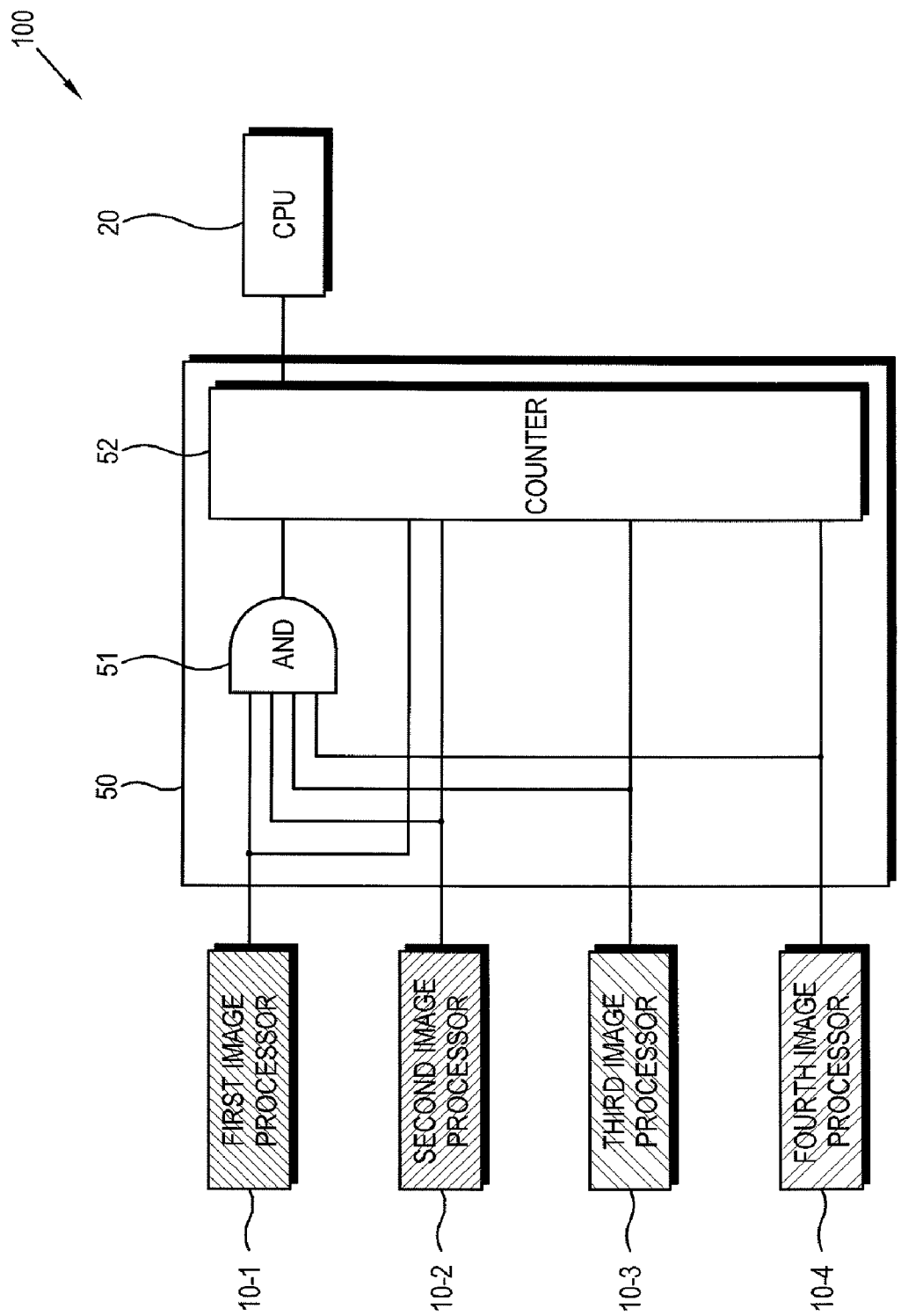
FIGS. 4 and 5 are circuit diagrams illustrating a controller according to the exemplary embodiments of the present general inventive concept.
Figure 5:
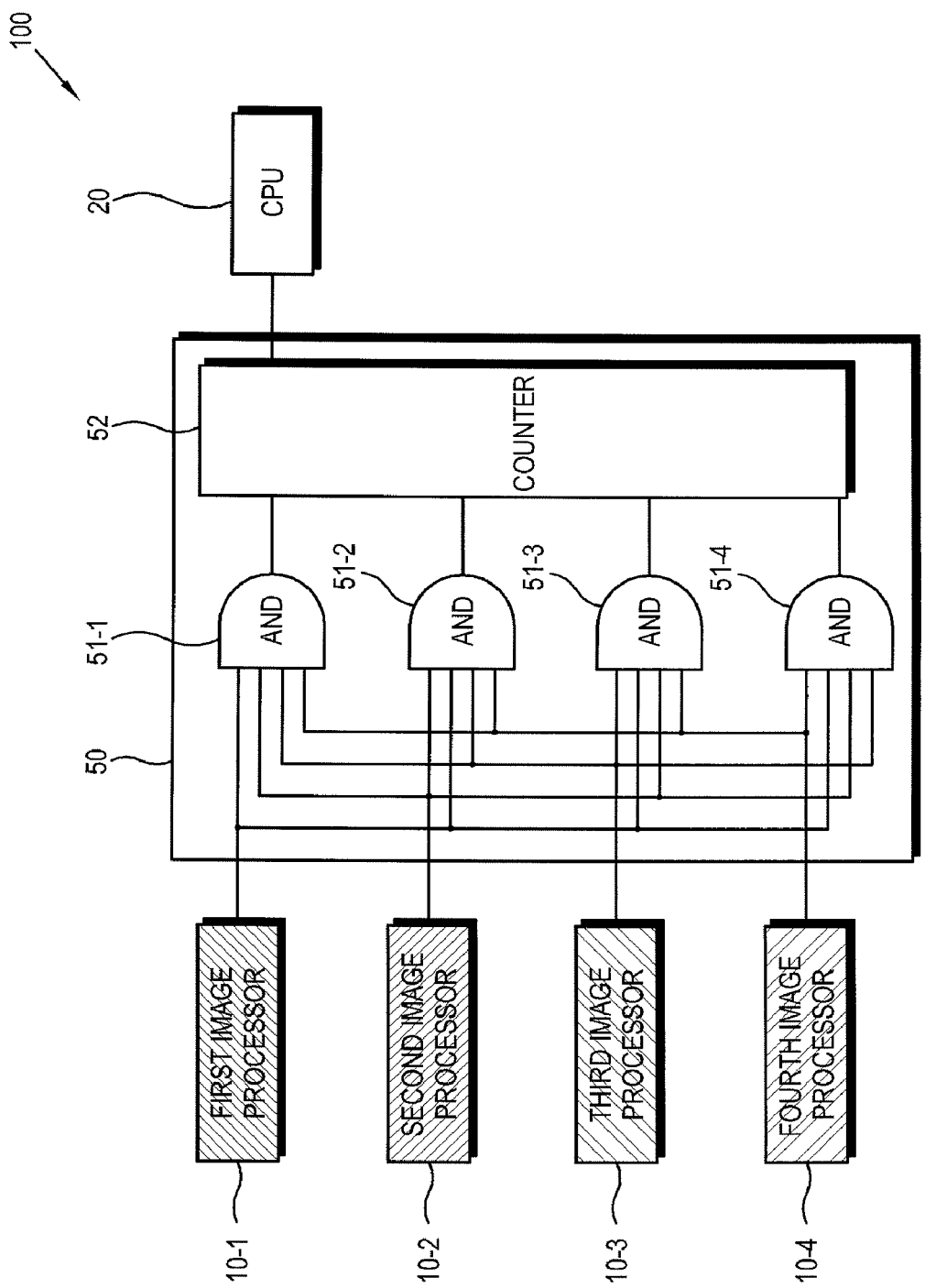

FIGS. 4 and 5 are circuit diagrams illustrating the controller 50 according to the exemplary embodiments of the present general inventive concept.

Referring to FIG. 4, the controller 50 may include an AND gate 51 and a counter 52 which both receive a respective signal from the image processors 10-1, 10-2, 10-3, and 10-4, individually. In particular, the circuit diagram of the image forming apparatus 100, as illustrated in FIG. 4, illustrates the four image processors 10-1, 10-2, 10-3, and 10-4 that correspond to the C, M, Y, and K colors, which may collectively perform halftoning of an image. Additionally, the controller 50 includes the single AND gate 51 and counter 52. The operation of the image forming apparatus as illustrated in FIG. 4 will be discussed in further detail below with reference to FIG. 6.

Figure 6:
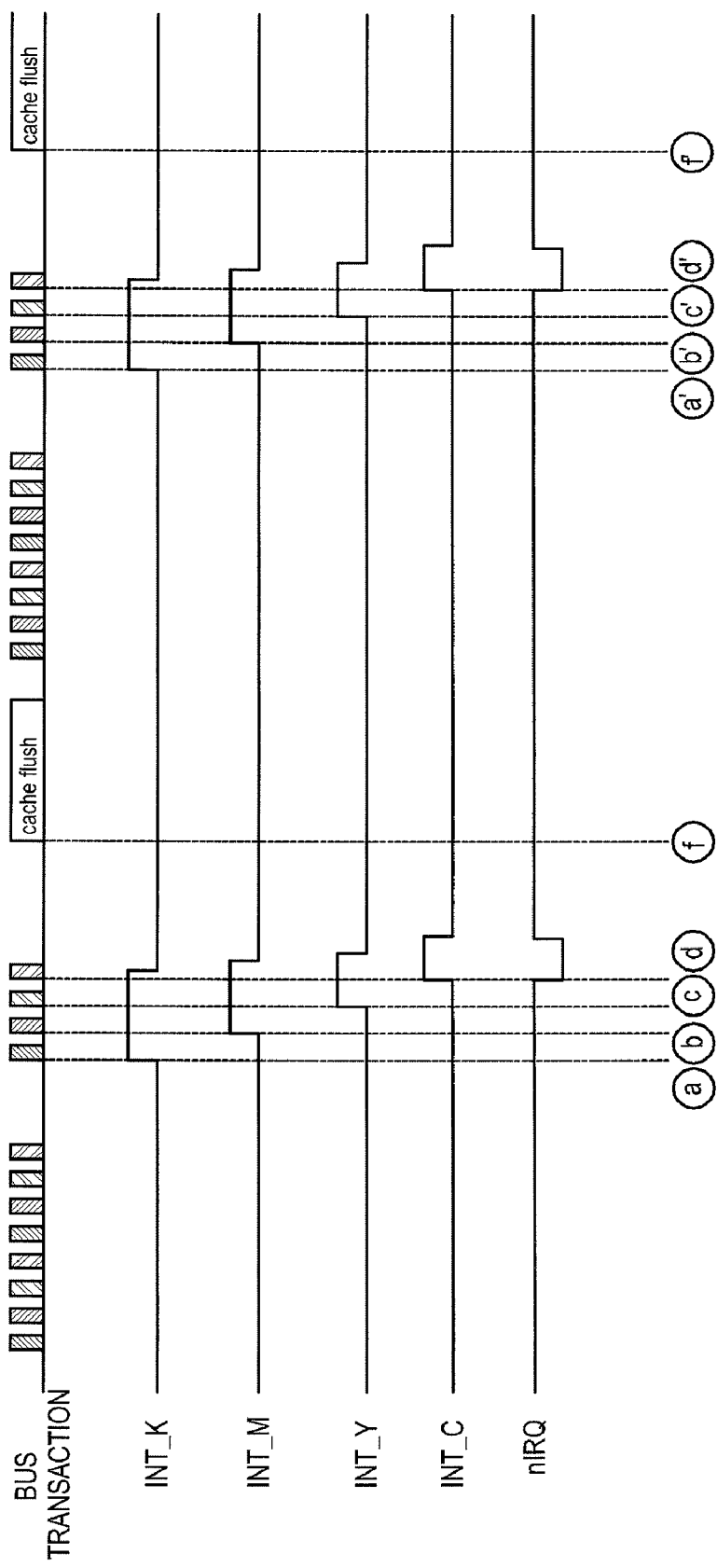
FIG. 6 is a waveform diagram illustrating an interrupt process of the image forming apparatus according to exemplary embodiments of the present general inventive concept.

FIG. 6 is a waveform diagram illustrating the interrupt process of the image forming apparatus according to an exemplary embodiment of the present general inventive concept.

Referring to FIG. 6, if the interrupt requests are sequentially input at points a, b, c, and d from the image processors 10-1, 10-2, 10-3, and 10-4 corresponding to the C, M, Y, and K colors, the controller 50 generates an interrupt signal nIRQ at point d which is the point where all of the interrupt requests are input from each of the image processors 10-1, 10-2, 10-3, and 10-4. The controller 50 then transmits the interrupt signal nIRQ to the CPU 20.

That is, the controller 50 generates a single interrupt signal nIRQ with respect to the plurality of interrupt requests, and transmits the interrupt signal nIRQ to the CPU 20. Thus, the CPU 20 executes a single interrupt routine according to the interrupt signal.

More specifically, the controller 50 generates the interrupt signal nIRQ at the last interrupt request point, i.e., at the point where the interrupt requests are transmitted from each of the image processors 10-1, 10-2, 10-3, and 10-4 have a logic value of 1 as implemented by the AND gate 51.

After the interrupt signal nIRQ is inputted to the CPU 20 by the controller 50 as a logic value of 1, the CPU 20 executes an interrupt routine in which the level of the interrupt signal is lowered from the logic value of 1 to a logic value of 0.

Therefore, as described above, the image forming apparatus 100 including the AND gate 51 generates the interrupt signal nIRQ and accordingly executes the interrupt routine only after receiving the interrupt requests from each of the image processors 10-1, 10-2, 10-3, and 10-4, thereby minimizing delay in processing time.

The image forming apparatus 100 may further include the secondary cache 40 located between the memory 30 and the CPU 20. In this case, a cache flush operation, which is an operation by which the contents of the secondary cache 40 are copied back to the memory 30, may be performed to synchronize the memory 30 and the secondary cache 40 at a point f. Point f is a point wherein the level of the interrupt signal is restored to the logic value of 1 after the interrupt routine is completed with respect to the image processors 10-1, 10-2, 10-3, and 10-4, as illustrated in FIG. 6.

Thus, the image forming apparatus 100 generates the interrupt signal nIRQ corresponding to the interrupt requests from the image processors 10-1, 10-2, 10-3, and 10-4 to execute the predetermined interrupt routine.

According to another exemplary embodiment of the present general inventive concept, as illustrated in FIG. 5, the controller 50 may also include a plurality of AND gates 51a, 51b, 51c, and 51d and a counter 52 to each receive signals from the image processors 10-1, 10-2, 10-3, and 10-4, individually.

In this case, if the interrupt requests are inputted from at least two of the plurality of image processors 10-1, 10-2, 10-3, and 10-4, the controller 50 including the plurality of AND gates 51-1, 51-2, 51-3, and 51-4 may accordingly be set to generate the interrupt signal.

Thus, the controller 50 generates the interrupt signal nIRQ only after receiving the preset number of interrupt requests from the predetermined number of image processors of the image processors 10-1, 10-2, 10-3, and 10-4.

Additionally, the controller 50 may also generate the interrupt signal nIRQ only after receiving the interrupt requests from exactly three of the image processors 10-1, 10-2, 10-3, and 10-4, or alternatively, after receiving the interrupt requests from exactly two of the image processors 10-1, 10-2, 10-3, and 10-4 corresponding to the plurality of colors, and accordingly transmit the interrupt signal nIRQ to the CPU 20.

Figure 7:
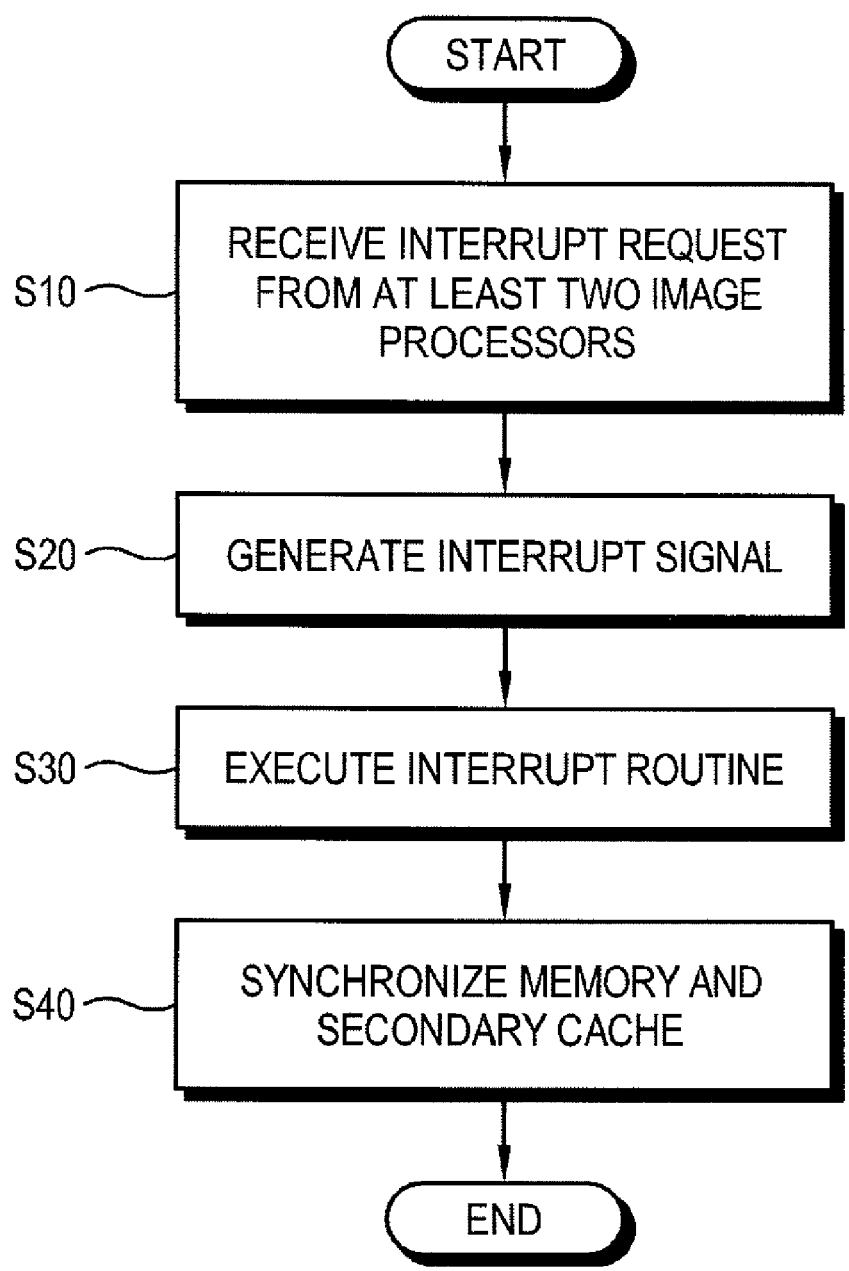
FIG. 7 is a flowchart illustrating a control method of the image forming apparatus according to an exemplary embodiment of the present general inventive concept.

Hereinafter, a control process of the image forming apparatuses having the above described respective configurations will be described in further detail with reference to FIG. 7.

First, the controller 50 receives the interrupt requests from the image processors 10-1, 10-2, 10-3, and 10-4 (operation S10).

If at least two of the image processors 10-1, 10-2, 10-3, and 10-4 generate the interrupt requests at operation S10, the controller 50 then generates the interrupt signal nIRQ and transmits the interrupt signal to the CPU 20 (operation S20).

The controller 50 may generate the interrupt signal nIRQ at the last interrupt request point from among the interrupt requests generated from the image processors 10-1, 10-2, 10-3, and 10-4.

The controller 50 may also generate the interrupt signal nIRQ after receiving the interrupt requests from either the combined image processors 10-1, 10-2, 10-3, and 10-4 or a subset thereof.

Then, the CPU 20 executes the interrupt routine whereby the level of the interrupt signal is lowered from the logic level of 1 to the logic level of 0 (operation S30).

If the interrupt routine is completed and the level of the interrupt signal is restored to the logic level of 1, the cache flush operation is performed to synchronize the memory 30 and the secondary cache 40 (operation S40).

As described above, the present general inventive concept provides an image forming apparatus which minimizes time delay in processing interrupt requests from image processors corresponding to a plurality of colors, and a control method thereof.

Also, the present general inventive concept provides an image forming apparatus which executes a single interrupt routine with respect to a plurality of image processors without repetitive operations to check completion of the interrupt routine, and a control method thereof.

Further, the present general inventive concept provides an image forming apparatus which minimizes time delay in processing interrupt requests and manages an overall system efficiently, and a control method thereof.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. An image forming apparatus, comprising:
   a plurality of image processors to process an image to be formed on a printing medium and to generate interrupt requests, each of the image processors corresponding to not more than one of a plurality of colors;
   a processor to execute an interrupt routine with respect to the plurality of image processors; and
   a controller to generate an interrupt signal and to transmit the interrupt signal to the processor when at least two of the plurality of image processors generate the interrupt requests after processing the image so that the processor executes the interrupt routine.

2. The image forming apparatus according to claim 1, wherein the controller generates the interrupt signal only after receiving a preset number of interrupt requests from the plurality of image processors.

3. The image forming apparatus according to claim 1, wherein the controller generates the interrupt signal only after receiving the interrupt requests from each of the image processors.

4. The image forming apparatus according to claim 3, wherein the controller generates the interrupt signal at the last interrupt request point among the interrupt requests from the plurality of image processors.

5. The image forming apparatus according to claim 1, wherein the controller comprises:
   at least one AND gate to receive the interrupt requests from the plurality of image processors and outputs the interrupt signal based on the interrupt requests.

6. The image forming apparatus according to claim 1, wherein the plurality of image processors performs halftoning to the image and generates the interrupt requests with respect to the halftoning.

7. The image forming apparatus according to claim 1, wherein the plurality of colors comprises cyan, magenta yellow and black.

8. The image forming apparatus according to claim 1, wherein the processor comprises:
   at least one register having an operation mode corresponding to a predetermined setting value, and
   the plurality of image processors process the image corresponding to the setting value of the register.

9. The image forming apparatus according to claim 1, further comprising:
   a memory to receive a command from the plurality of image processors to process the image.

10. The image forming apparatus according to claim 9, further comprising:
    a secondary cache provided between the memory and the CPU, wherein
    the controller synchronizes the memory and the secondary cache after the processor executes the interrupt routine.

11. A method of controlling an image forming apparatus which comprises a plurality of image processors to process an image to be formed on a printing medium, each of the plurality of image processors corresponding to not more than one of a plurality of colors, the method comprising:
    generating an interrupt signal when at least two of the plurality of image processors generate interrupt requests after processing the image; and
    executing an interrupt routine with respect to the plurality of image processors.

12. The method according to claim 11, wherein generating the interrupt signal comprises generating the interrupt signal only after a preset number of interrupt requests are inputted from the plurality of image processors.

13. The method according to claim 11, wherein generating the interrupt signal comprises generating the interrupt signal only after each of the image processors generate an interrupt request.

14. The method according to claim 13, wherein generating the interrupt signal further comprises generating the interrupt signal at the last interrupt request point from among the interrupt requests generated from the plurality of image processors.

15. The method according to claim 11, wherein the image forming apparatus comprises a memory to receive a command from the plurality of image processors to process the image by a processor, and a secondary cache provided between the memory and the processor, further comprising:
    synchronizing the memory and the secondary cache after generating the interrupt signal.

16. An image forming apparatus having a plurality of image processors to generate a plurality of interrupt requests, each of the plurality of image processors corresponding to not more than one of a plurality of colors defining image data, the image forming apparatus comprising:
- a memory to process the plurality of interrupt requests to process the image upon receipt of a command being transmitted from the plurality of image processors; and
- a controller to generate an interrupt signal responsive to the plurality of interrupt requests generated by the plurality of image processors at a predetermined interrupt request point.

17. The image forming apparatus of claim 16, wherein, the predetermined interrupt request point is defined as the point wherein the plurality of interrupt requests are transmitted from each of the image processors.

18. The image forming apparatus of claim 17, further comprising:
- a central processing unit to execute a predetermined interrupt routine responsive to the interrupt signal.

19. The image forming apparatus of claim 17, wherein the central processing unit comprises:
- a register connected to an operator, the register having an operation mode to define a predetermined setting value, wherein the plurality of image processors process the image according to the predetermined setting value.

20. The image forming apparatus of claim 16, wherein the controller comprises:
- a plurality of AND gates and a counter to each receive the plurality of interrupt requests and accordingly each of the AND gates and the counter generate the interrupt signal.

* * * * *